April 30, 1963     A. H. TURNER     3,087,509
CHECK VALVE
Filed Jan. 2, 1962

INVENTOR
ALBERT H. TURNER
BY David S. Fishman
ATTORNEY

United States Patent Office 3,087,509
Patented Apr. 30, 1963

3,087,509
CHECK VALVE
Albert H. Turner, East Hampton, Conn., assignor to United Aircraft Corporation, East Hartford, Conn., a corporation of Delaware
Filed Jan. 2, 1962, Ser. No. 163,490
2 Claims. (Cl. 137—467)

This invention relates to a check valve which is adapted for use in a fluid system having a requirement for a valve which will remain open after being actuated to the open position. More particularly, this invention relates to a check valve which opens when a predetermined pressure is applied to the valve, and which is positively locked in the open position regardless of changes in the pressure level of the actuating fluid.

In the present invention a latch mechanism is provided for positively retaining the valve in the open position upon being actuated to the open position, and a cam is provided for unlatching the locking mechanism when it is desired to return the valve to the closed position. Thus, no wedging action is needed to keep the valve open, and the force required to unlock the valve depends only on the spring forces associated with the latch mechanism. That is, when flow through the valve has ceased, the force required to close the valve is a constant which depends only on internal spring forces and which is independent of the pressure of the fluid which flowed through the value. Also, practically no force is absorbed by the latching mechanism in locking the valve in the open position, and hence there is no error in force actuation of the valve.

A spring holds the value in the closed position until the pressure on the valve face overcomes this spring force and drives the valve to the open position where it is locked by a spring loaded latch mechanism. The first spring force is constantly loading the valve toward the closed position and opposes the force of the latch mechanism spring. Thus, the force needed to overcome the latch spring is reduced by the spring force loading the valve in the closed direction, and that spring force is available to return the valve to the closed position when the valve is unlocked.

Accordingly, one feature of the present invention is a novel valve mechanism wherein the valve is positively retained in the open position regardless of the pressure of the fluid flowing through the valve, and reliability of operation is improved.

Another feature of the present invention is a novel value mechanism wherein the valve is locked in the open position by the positive action of a latch mechanism.

Still another feature of the present invention is a novel valve mechanism wherein the valve is locked in the open position by a latch and wherein a cam is provided for unlocking the valve.

Still another feature of the present invention is a novel valve mechanism which is held closed by a spring load, locked in the open position by a spring loaded latch, and which is unlocked by applying to the latch a force equal to the difference between the force of the valve loading spring and the latch spring.

Other features and advantages will be apparent from the specification and claims, and from the accompanying drawings which illustrate an embodiment of the invention.

Figure 1:
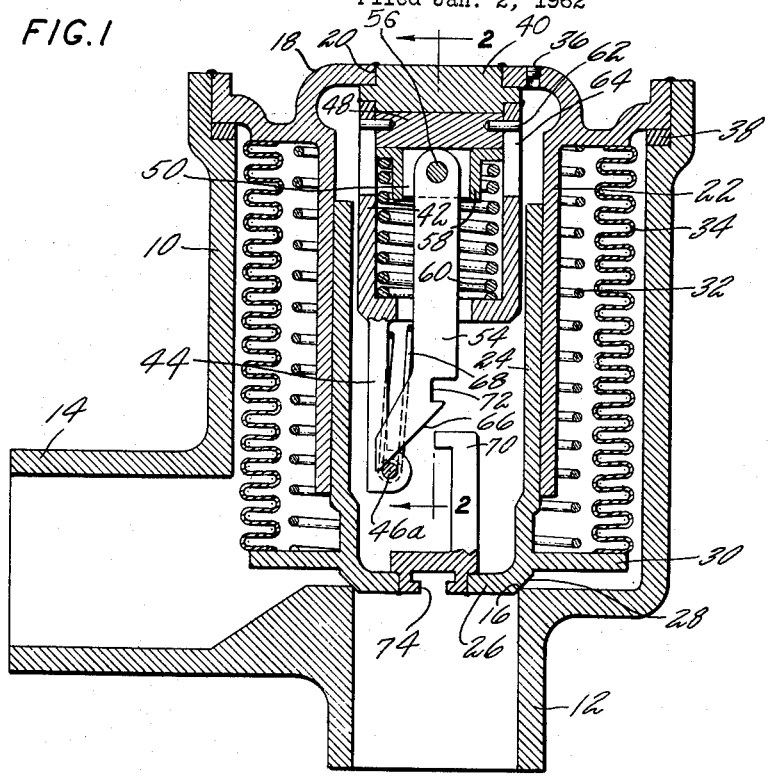
FIG. 1 is a sectional view of the valve mechanism of the present invention.

Referring now to FIG. 1, the valve housing 10 has an inlet line 12 and an outlet line 14. The edge 16 at the end of inlet passage 12 constitutes a valve seat. The housing is closed by a bonnet or cap 18 which is secured to the housing by any convenient method such as welding or brazing, and which has a central opening 20 and a depending annular sleeve 22. A piston 24 is slidably mounted within sleeve 22, and the end portion 26 thereof constitutes a valve face, the piston and valve face constituting a closure element. A conical surface 28 on the valve face serves as a mating surface with seat 16 to prevent flow when the valve is in the closed position, and rim 30 extending from piston 24 provides an enlarged area for rapid opening of the valve.

A spring 32 extends between cap 18 and rim 30 and urges piston 24 and valve face 26 downward against seat 16. A bellows 34 is attached to and extends between cap 18 and rim 30 to seal the interior of the bellows, and a tap 36 is provided for evacuating the interior of the bellows. A shim ring 38 is provided at the junction between cap 18 and housing 10 for adjusting the load on the valve face.

Figure 2:
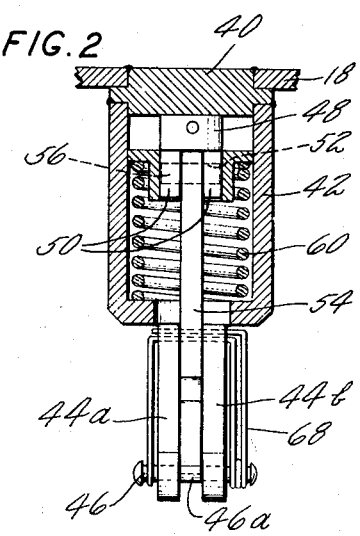
FIG. 2 is a view along line 2—2 of FIG. 1 shown partly in elevation.

A plug 40 is secured within opening 20 as by brazing or welding to close off the cap, and a yoke 42 is attached to plug 40. A bifurcated element 44 depends from yoke 42, and a pin 46 extends between the parts 44a and 44b (see FIG. 2) of bifurcated element 44 to form a cam surface 46a therebetween. A guide 48 is slidably fitted within yoke 42 and normally abuts plug 40. As can best be seen in FIG. 2, a pair of legs 50 depend from guide 48, each leg 50 having an opening 52 therethrough. Latch 54 is pivotally mounted between legs 50 by pin 56 extending through the latch and openings 52. As can best be seen in FIG. 2, the sides of guide 48 have been slabbed-off for weight saving purposes. A bushing 58 is held against guide 48 by spring 60 which extends between yoke 42 and bushing 58, and bushing 58 serves to retain pin 56 in place. A pair of pins 62 extend into guide 58 and ride in passages 64 in yoke 42 to prevent any rotational movement of guide 48, legs 50, or latch 54.

As can best be seen in FIG. 1, the end 66 of latch 54 constitutes a cam follower surface which overlaps and is held in contact with cam 46a by a lightly loaded detent spring 68. A hook 70 extends from valve face 26 toward latch 54, and a notch 72 is provided in latch 54 to receive hook 70. A notch 74 is provided in valve face 26 for unlocking the valve in a manner to be described hereinafter.

The valve is shown in FIG. 1 in its closed position with piston 24 and face 26 being held against seat 16 by the force of spring 32 and the bellows spring force. When the pressure of the fluid in inlet line 12 creates a force on valve face 26 sufficient to overcome the force of spring 32 and bellows 34, piston 24 and valve face 26 will be moved upward to allow fluid to flow from inlet line 12 to outlet line 14. As soon as the valve face is lifted off the seat, the enlarged area of rim 30 is exposed to the pressure of fluid in inlet line 12 and the valve closure element moves rapidly to the full open position with a snap action. As the full open position is approached, the end of hook 70 contacts the cam follower surface 66 of latch 54 and pivots latch 54 in a clockwise direction. The end of hook 70 then engages notch 72 and spring 68 returns latch 54 to its normal vertical position to lock the valve closure element in the open position. The load of spring 60 is greater than the load of spring 32 and bellows 34, and thus the closure element is held in the full open position regardless of changes in pressure of the fluid flowing from inlet line 12 to outlet line 14. Thus, it can be seen that the force of spring 32 and bellows 34 normally holds the valve closed and the force of spring 60 acts through latch 54 to hold the valve in the full open position.

When it is desired to return the valve to the closed position an instrument is inserted in notch 74 and a downward force is applied sufficient to overcome the difference between the upward force of spring 60 and the downward force of spring 32 and bellows 34. This results in a downward movement of valve face 26, piston 24, hook 70, latch 54, bushing 58, and guide 48. Cam follower surface 66 is drawn across cam 46a and latch 54 is pivoted in a clockwise direction to release lock 60 from notch 72. Valve face 26 and piston 24 are then free to move downward to reengage seat 16, and it will be observed that once the unlocking action takes place the force of spring 32 and bellows 34 is available for driving the valve to the closed position. Also, once the unlocking takes place spring 60 returns latch 54, bushing 58 and guide 48 to the normal position as shown in FIG. 1.

It is to be understood that the invention is not limited to the specific embodiment herein illustrated and described but may be used in other ways without departure from its spirit as defined by the following claims.

I claim:

1. In a valve, a valve housing, an annular flange attached to said housing and forming a chamber, a piston movable in said chamber, a valve face attached to said piston, a valve seat, said valve face cooperating with said valve seat in a first position to prevent flow through said valve and in a second position to permit flow through said valve, said valve face and said piston being movable from said first position to said second position in response to pressure thereon, and means for locking said valve face and said piston in said second position, said locking means including a yoke attached to said housing, a guide within said yoke, a spring extending between said yoke and said guide to position said guide, a latch pivotably mounted on said guide, and a hook extending from said valve face, said latch and said hook connecting to lock said valve face in said second position.

2. In a valve, a valve housing, an annular flange attached to said housing and forming a chamber, a piston movable in said chamber, a valve face attached to said piston, a valve seat, said valve face cooperating with said valve seat in a first position to prevent flow through said valve and in a second position to permit flow through said valve, said valve face and said piston being movable from said first position to said second position in response to pressure thereon, and means for locking said valve face and said piston in said second position, said locking means including a yoke attached to said housing, a guide within said yoke, a spring extending between said yoke and said guide to position said guide, a latch pivotably mounted on said guide, a hook extending from said valve face, said latch and said hook connecting to lock said valve face in said second position, a finger extending from said yoke, a cam on said finger, said cam contacting said latch, and means for moving said valve face from said second position toward said first position thereby translating and pivoting said latch to disconnect said latch from said hook.

References Cited in the file of this patent

FOREIGN PATENTS

| | | |
|---|---|---|
| 544,151 | Germany | Feb. 13, 1932 |
| 858,501 | Germany | Dec. 8, 1952 |